United States Patent [19]
Gaeta

[11] Patent Number: 5,926,589
[45] Date of Patent: Jul. 20, 1999

[54] HIGH-SPEED INTEGRATED-OPTICS SWITCHABLE DELAY-LINE USING TROMBONE SECTIONS

[75] Inventor: Celestino J. Gaeta, Simi Valley, Calif.

[73] Assignee: Hughes Electronics Corporation, El Segundo, Calif.

[21] Appl. No.: 08/888,493

[22] Filed: Jul. 7, 1997

[51] Int. Cl.[6] .................................................. G02B 6/35
[52] U.S. Cl. .............................................. 385/16; 385/15
[58] Field of Search ........................... 385/2, 15, 1, 18, 385/24, 31, 32, 39, 47, 51

[56] References Cited

U.S. PATENT DOCUMENTS

| | | | |
|---|---|---|---|
| 4,671,605 | 6/1987 | Soref ............................................. | 385/2 |
| 4,961,621 | 10/1990 | Su ................................................ | 385/16 |
| 5,222,162 | 6/1993 | Yap et al. ..................................... | 385/14 |
| 5,455,878 | 10/1995 | Thaniyavarn .................................. | 385/16 |
| 5,701,372 | 12/1997 | Magel et al. ................................... | 385/24 |

OTHER PUBLICATIONS

Sullivan, C.T., et al., "Switched time delay elements based on AlGaAs/GaAs optical waveguide technology at 1.32μm for optically controlled phased array antennas" SPIE vol. 1703 (1992) pp.264–271, [No Month].

Primary Examiner—John D. Lee
Assistant Examiner—Juliana K. Kang
Attorney, Agent, or Firm—V. D. Duraiswamy; M. W. Sales

[57] ABSTRACT

The disclosure describes a switchable optical delay device which is small, inexpensive, lightweight, has high cross-talk isolation, and is capable of sub-microsecond switching times. The delay device uses low-reflection terminations, a single input, and a single output to minimize cross-talk. The device is preferably integrated onto a substrate in either a trombone-shaped configuration or a more compact nested configuration.

17 Claims, 6 Drawing Sheets

HIGH-SPEED INTEGRATED-OPTICS SWITCHABLE DELAY-LINE USING TROMBONE SECTIONS

BACKGROUND OF THE INVENTION

1. Field of the Invention

The present invention relates generally to delay lines and, more specifically, to high-speed integrated-optical switchable delay lines.

2. Description of Related Art

In communication and radar systems, antenna elements are often arranged in space and connected to a signal source so as to produce a directional radiation pattern. Such arrangements are referred to as phased arrays. Phased arrays offer the advantages of high directivity and controlled antenna radiation pattern steering without the use of moving mechanical mechanisms.

Phased array antenna systems function by varying the phase of the signal supplied to the array elements. The variation of phase permits steering of the radiation pattern. By time-delaying the signal sent to various antenna elements in the array, a phase difference between the signals driving the antenna elements is created. By using a number of selectable time delays the radiation pattern can be effectively steered. As the time delays for each element are switched, the direction of the radiation pattern changes. The switching speed is the rate at which the delay time is switched. These delays can be created using either microwave techniques or optical techniques. Optical techniques traditionally use fiber optic cable or integrated optical waveguides arranged in a configuration with optical switches to create selectable time delays.

The advantages of using optical techniques over microwave techniques include: smaller and lighter delay devices, wider bandwidth of operation eliminating radiation pattern squint and enabling narrow pulse operation on large antennas, lower signal loss through the delay network, and higher signal isolation than traditional transmission lines.

At present there exists a number of methods for creating switchable time delays in optical systems. These methods all have inherent disadvantages as noted below.

Switching optical energy into various length optical fibers of the same material can be used to create a delay. In this configuration there is one optical input and one optical output, with multiple fiber optic paths that may be selected for various propagation lengths. Assuming the speed of propagation is the same for all of the fibers used, the varying lengths of the fibers determine the time delay. It is however, in practice, very difficult to cut the optical fibers with the precision necessary to create consistent delays. If high switching speeds are to be used, this method requires the use of specialized optical switches, which are typically integrated onto a substrate and increase the insertion loss of the delay unit. Additionally, it is difficult to align the precision-cut optical fibers with the integrated optical switches. Misalignment can lead to further increases in insertion loss of the optical system.

Another method for creating a switchable optical delay unit is distributing an optical signal source among fibers of various length, each fiber having an optical detector. The difference in the lengths of the fibers results in time differences for the signals that are output by the delay unit. To physically realize this method, an optical detector is needed for each fiber that is used, thus adding size and cost to the delay unit. For a desired delay, the proper detector output is selected and the remaining detectors are ignored. The distribution of the signal among multiple fibers leads to a reduction in the signal level that is received at any given detector, thus degrading the signal to noise ratio at the detector. As in the first method, the fibers must be precision cut to the proper length, which is very difficult and expensive.

A third method for creating switchable time delays in an optical system takes advantage of dispersion in optical fibers. This method uses the known dispersion characteristics of a given optical fiber to create a time delay. That is, different wavelengths will propagate at known different speeds in the fiber. Rapid switching of the frequency of an optical source, typically a laser or infrared emitter, will create a delay in the system. The problem with this method is that rapid switching of the optical source frequency is difficult to implement in practice.

Another method for creating an optical delay as proposed by Sullivan et. al. (SPIE Vol. 1703(1992) pp.264–271) consists of optical waveguides in a serpentine arrangement integrated onto a substrate. In this arrangement, a delay segment consists of two continuous waveguides used to create a long and a short optical path between optical switches. The long optical path serves the function of the delay path and the short path serves as the non-delay or reference path. The optical switches are used to channel the optical energy into the desired optical path. By cascading multiple delay sections, various time delays can be achieved. In applications where cross-talk isolation is critical, the Sullivan method of creating a time delay is inadequate. Cascading multiple delay sections, as designed according to the Sullivan method, leads to degradation of device cross-talk isolation.

Therefore, there exists the need for a delay section that is small, inexpensive, lightweight, requires only one optical detector, and has high cross-talk isolation even when multiple delay sections are cascaded together.

SUMMARY OF THE INVENTION

The present invention may be embodied in an integrated delay section which is small, inexpensive, lightweight, requires only one optical detector, has high cross-talk isolation, and is capable of sub-microsecond switching times. The present invention uses trombone-shaped sections, having one input and one output, integrated onto a substrate with optical switches so as to provide varying length optical paths. Because each trombone-shaped section has one input and one output, cross-talk isolation is maintained between sections. Additionally, the present invention uses low-reflection terminations to reduce optical reflections, which lead to increased optical cross-talk. The present invention eliminates the difficulty of precision cutting optical fibers, as optical integration techniques are very precise and do not require cutting. Integration of the optical device also eliminates misalignment between optical fiber and optical switches. Misalignment is eliminated because the optical waveguide, which is used in place of optical fiber, and the optical switches are integrated together on the same substrate. Optical energy is channeled through a selected optical path, which may be a relatively short reference path, or a longer delay path. A relative delay is created when the optical energy is channeled into the longer path. This is due to the fact that it takes the optical energy more time to reach the optical detector when the path of propagation is longer. Each set of optical paths (reference and delay) is referred to as a delay section.

It is possible to cascade many delay sections together to create a large number of selectable delays, while still preserving high cross-talk isolation, this is due to the fact that each delay section has one input and one output. Additionally, it is possible to integrate the delay sections in a nested structure to reduce the physical size of the delay device. When the present invention is embodied in a nested structure, it may be necessary for optical waveguides to cross one another. Waveguide crossings can be made without degradation to cross-talk performance, provided the crossings occur at angles near 90°.

The invention itself, together with further objects and attendant advantages, will best be understood by reference to the following detailed description, taken in conjunction with the accompanying drawings.

DESCRIPTION OF THE PREFERRED EMBODIMENT

Figure 1:
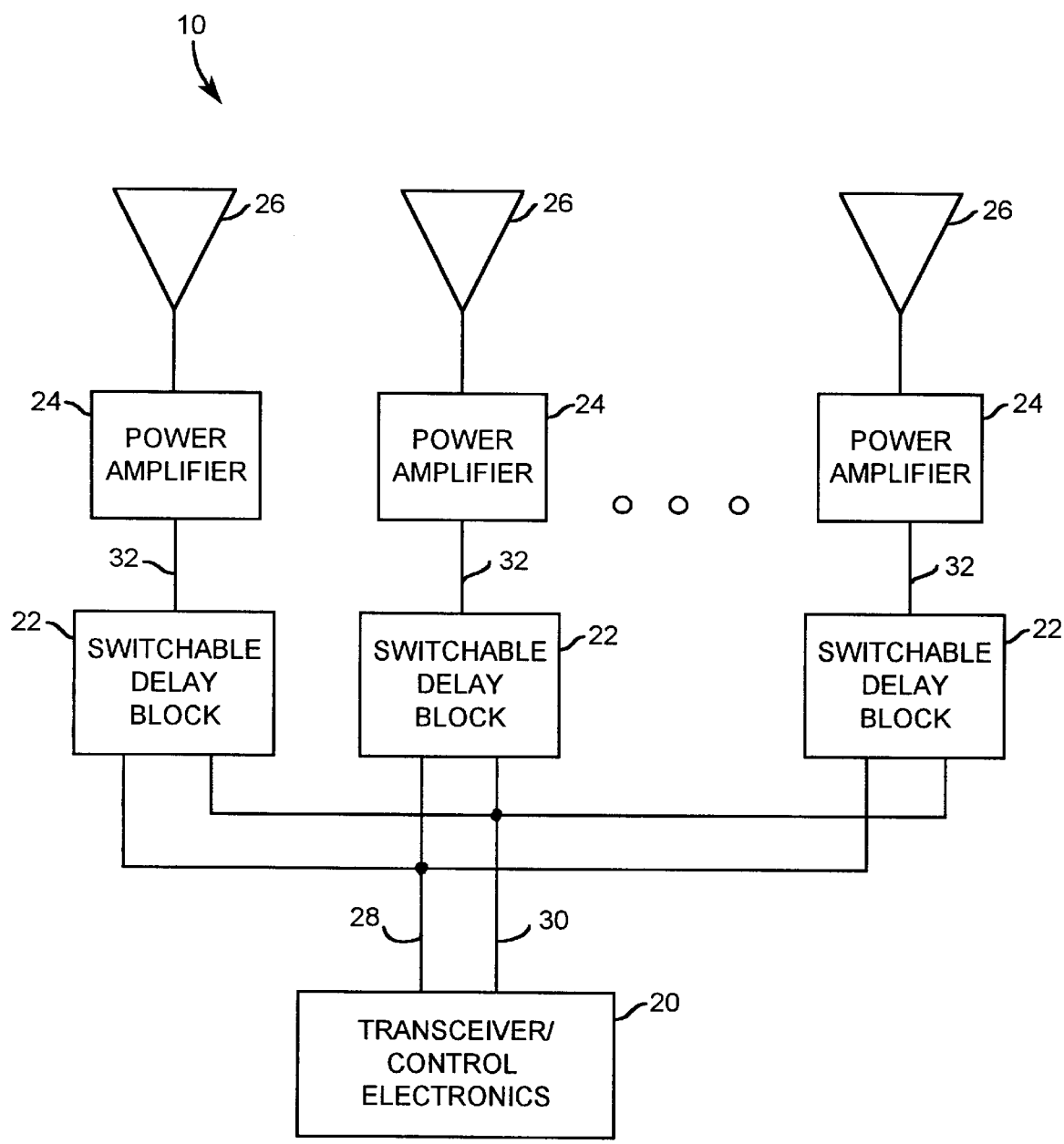
FIG. 1 is a block diagram illustrating a phased array system using switchable delay blocks.

FIG. 1 illustrates a phased array system 10 using switchable delay blocks embodying the present invention. The phased array system 10 may include a transceiver/control electronics unit 20, a plurality of switchable delay blocks 22, a plurality of power amplifiers 24, and a plurality of antenna elements 26.

The transceiver/control electronics unit 20 generates a signal for transmission, which is coupled to the delay block 22 via a wire 28. The transceiver/control electronics unit 20 is also responsible for generating control signals that are connected to the switchable delay blocks 22 by a wire 30. The control signals dictate the time by which each of the switchable delay blocks 22 will delay its output. The control signals, therefore, determine the direction of the radiation pattern output by the phased array system. The determination of phase delay (and therefore time delay) for particular radiation pattern directions is well known in the art.

The signal for transmission is coupled to the plurality of switchable delay blocks 22 which have delays selected by the transceiver/control electronics unit 20 control signals. The switchable delay blocks 22 delay their output signals 32 by the programmed delay time, through the use of various optical delay lines.

After being delayed for the time specified by the transceiver/control electronics 20 unit, the switchable delay blocks 22 provide output signals that are fed, via wires 32, to the power amplifiers 24 which amplify the signals to acceptable levels for transmission by the antenna elements 26.

Figure 2:
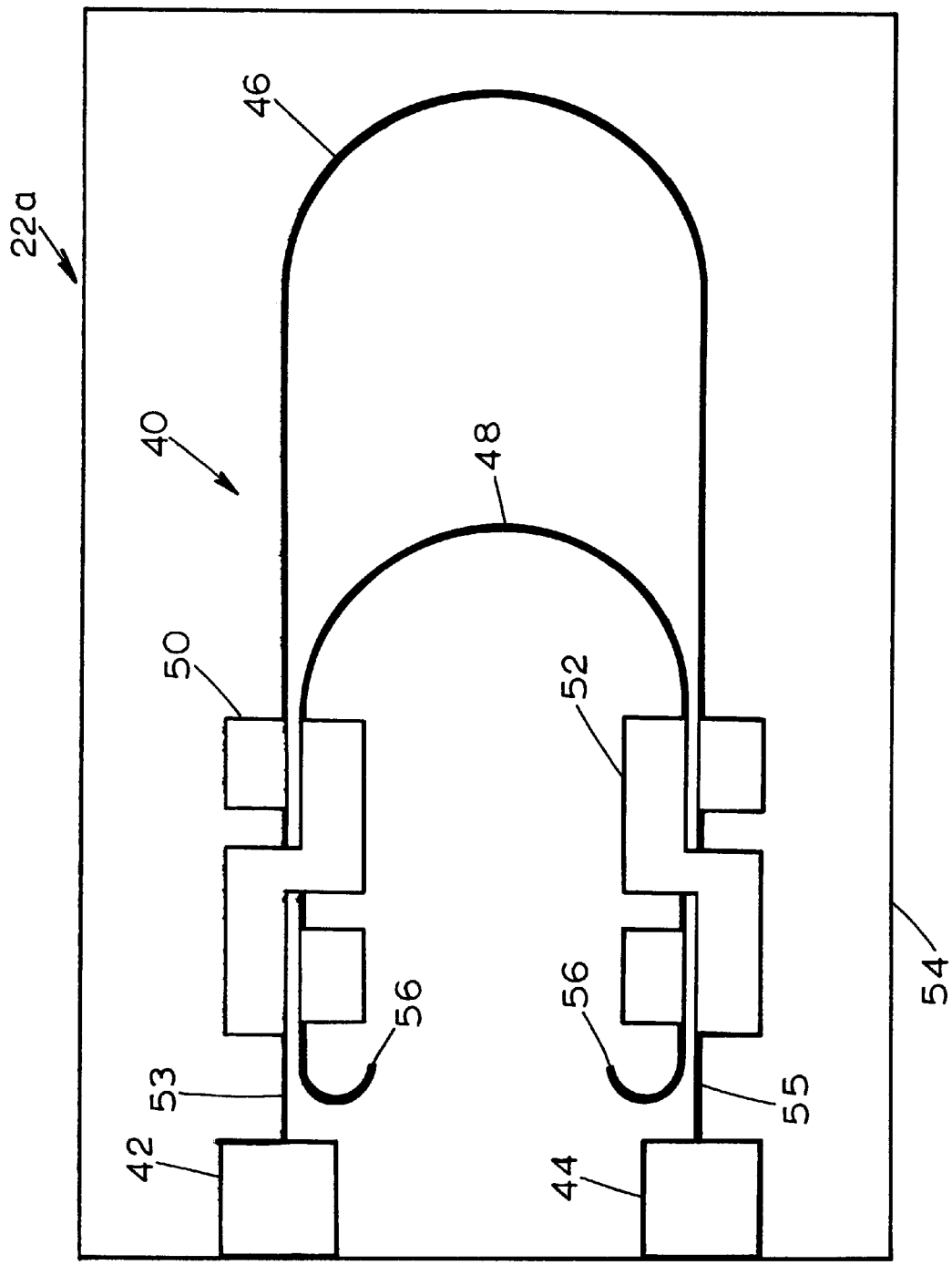
FIG. 2 is a diagram illustrating an embodiment of a switchable delay block of the present invention including a single trombone optical delay section.

In accordance with the present invention, several embodiments exist for the switchable delay block 22 of FIG. 1. Three of these embodiments will subsequently be referred to by reference numbers 22a, 22b, and 22c. It should be recognized that any implementation of the phased array system 10 may utilize any or all of the embodiments for the switchable delay block 22. Referring to FIG. 2, a switchable delay block 22a embodying the present invention including a single integrated trombone-shaped optical delay section 40, an optical emitter 42, and an optical detector 44 is illustrated. The trombone optical delay section 40 includes an optical delay path 46 and an optical reference path 48 coupled to the delay path 46 through two optical switches 50, 52. The optical switches 50, 52 are controlled by control signals 30 from the transceiver/control electronics unit 20. The optical emitter 42 is coupled to an input 53 of the delay path 46 and the optical detector 44 is coupled to an output 55 of the delay path 46.

In a preferred embodiment, the optical switches 50, 52 are implemented using an alternating delta-beta configuration. This configuration, which is well known in the art, divides the switch electrodes into multiple segments in which the direction of the applied electric field is reversed between adjacent segments. Preferably, the equal length segments have a 6 micron gap and overall length of 1.5 cm for operation at a wavelength of 1.55 microns.

The two optical paths 46, 48 and the two optical switches 50, 52, along with the optical emitter 42 and the optical detector 44, are integrated onto a substrate 54. The reference path 48 is shorter than the delay path 46 and is terminated at each end with a low-reflection termination 56. In a preferred embodiment the substrate 54 is lithium niobate. However, materials such as glass or Gallium Arsenide (GaAs) may be used.

An electrical signal containing information to be transmitted is connected to the optical emitter 42, which is a photon emitting device such as an infrared emitter or a laser. The optical emitter 42 converts the input electrical signal into optical energy. The optical energy from the optical emitter 42 is coupled to the input 53 of the optical delay path 46. If a delay is desired, the first optical switch 50 passes the optical energy through the delay path 46. If a delay is not desired, the first optical switch 50 channels the optical energy into the reference path 48.

After passing through either the reference path 48 or the delay path 46, the optical energy reaches the second optical switch 52. If a delay is desired, the second optical switch 52 couples the optical energy directly to the detector 44. If a delay has not been selected, the optical energy is channeled from the reference path 48, to the delay path 46, and subsequently on to the optical detector 44. Because the delay path 46 is longer than the reference path 48, the optical energy takes longer to propagate through the delay path 46, thus creating a delay. In a particular embodiment, the delay through the delay path 46 is 82 picoseconds (psec) relative to the delay through the reference path 48.

After passing through the second optical switch 52, the optical energy is coupled from the delay path 46 to the optical detector 44. The optical detector 44 converts the optical energy to an electrical signal. The output electrical signal contains information identical to the input electrical signal but will be delayed in time, relative to the reference path, if the optical energy containing the information was passed through the optical delay path 46.

Each trombone-shaped optical delay section has one input and one output. This feature provides cross-talk isolation between optical delay sections which are cascaded together. That is, the cross-talk of each optical delay section is independent of every other optical delay section.

The optical emitter 42 and the optical detector 44 may or may not be included in the optical delay blocks 22a, 22b, and 22c. The optical emitter 42 and the optical detector 44 provide the functions of converting between electrical signals and optical signals. If a system comprising the delay block is all optical, there may be no need to convert electrical signals to optical signals or optical signals to electrical signals. Therefore, the optical emitter 42 and the optical detector 44 may be omitted from the optical delay blocks.

The low-reflection terminations 56 minimize optical back-reflections that lead to increased optical cross-talk and interference with the optical emitter. Because the radius of curvature for the low-reflection terminations 56 is small, typically on the order of 0.5 mm, any undesired optical energy remaining in the reference path after optical switching is emitted into the substrate 54 surrounding the low-reflection terminations 56.

Figure 3:
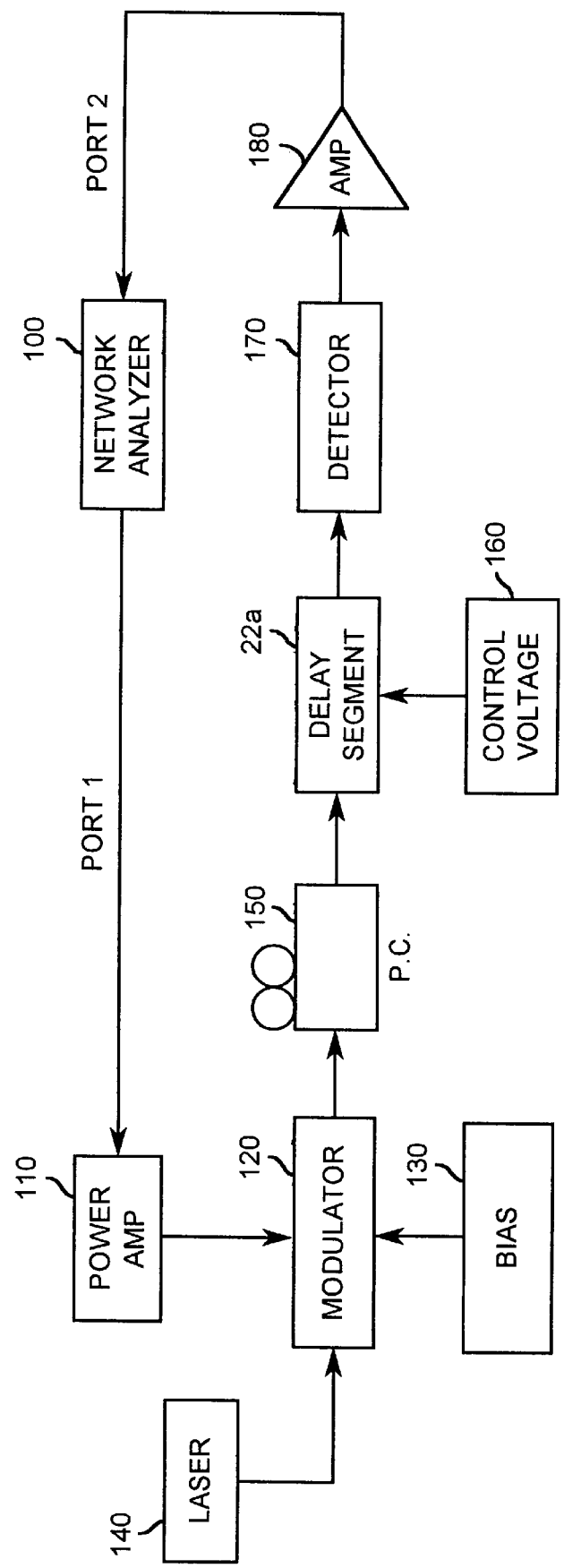
FIG. 3 is a diagram illustrating a relative delay experiment using the present invention shown in FIG. 2.

FIG. 3 illustrates a relative-delay experiment conducted on the present invention as shown in FIG. 2. The purpose of the experiment was to confirm that the device constructed met the design goal of a 82 psec delay. The output of a network analyzer 100 at 1.8 GHz is fed to a power amplifier 110, which is further coupled to an optical modulator 120. The optical modulator 120 is biased by a power supply 130 and modulates the output of a laser 140 with the output from the power amplifier 110. The output from the modulator 120 is not properly polarized, therefore a polarization controller 150 is used to correct the polarization of the energy. The output of the polarization controller 150 is coupled to the delay section 40 of the present invention. The optical switches 50, 52 of the delay section 40 are controlled by a control voltage source 160. The output of the delay section 40 is connected to an optical detector 170, which detects the intensity-modulated optical energy. An amplifier 180 is used to amplify the output of the optical detector 170. The output of the amplifier 180 is coupled to the input port of the network analyzer 100, which allows for comparison between the output and input of the network analyzer 100. The results are as noted for the long and short paths. Propagation through the short path yields a phase of 25.2°, whereas propagation through the long path yields a phase of −27.4°. The total phase difference for the two propagation paths is 52.6° at 1.8 GHz which corresponds to a time delay of 81.2 psec. Thus, the relative delay between two propagation paths is 81.2 psec.

Figure 4:
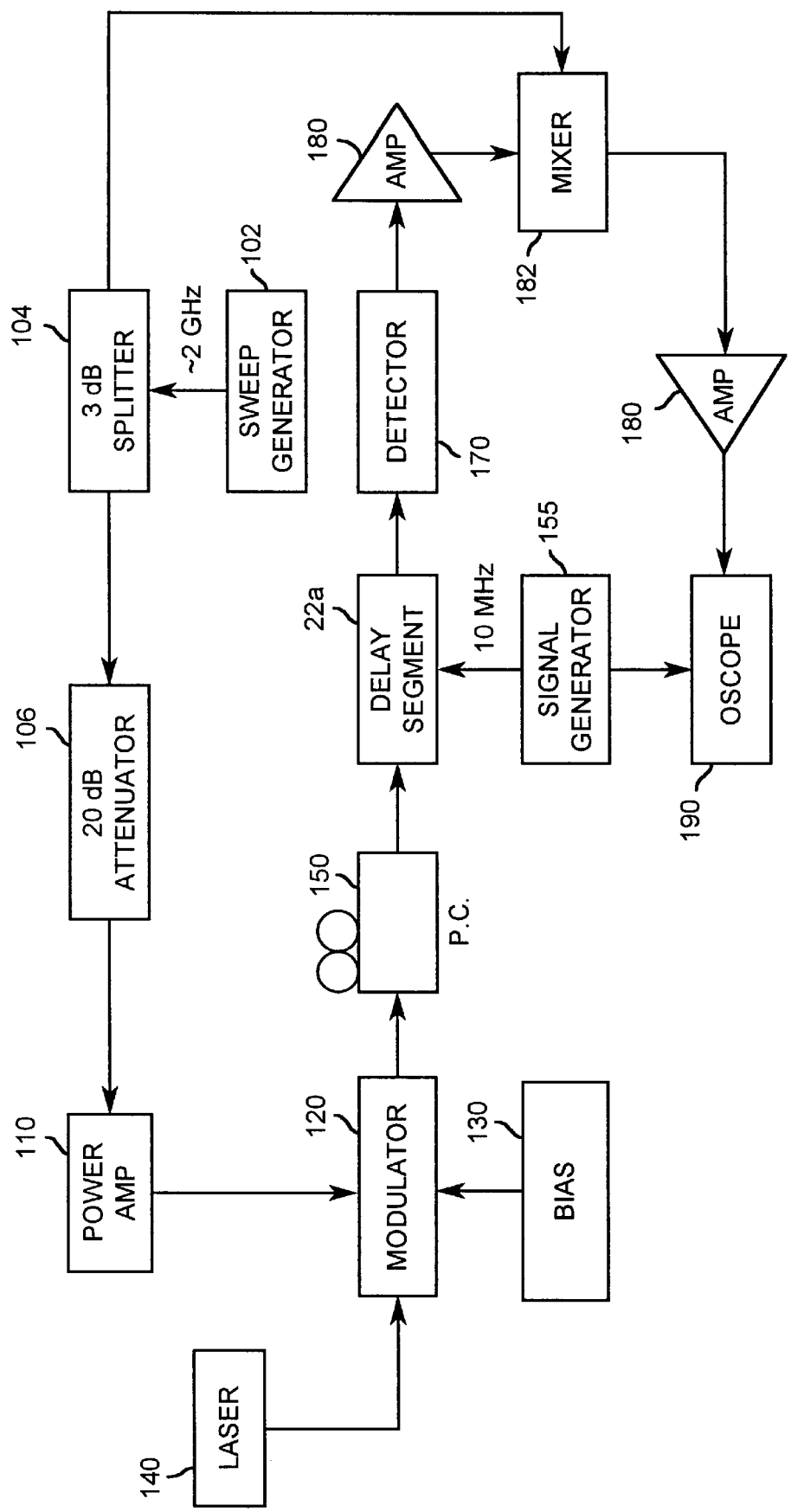
FIG. 4 is a diagram illustrating an experiment designed to demonstrate the switching capability of the present invention shown in FIG. 2.

FIG. 4 is a diagram illustrating an experiment designed to demonstrate the switching capability of the device of the present invention as shown in FIG. 2. The experiment includes a sweep generator 102, operating at 2 GHz, connected to a 3 dB splitter 104. One output of the 3 dB splitter 104 feeds a 20 dB attenuator 106, which is coupled to a power amplifier 110. In an identical configuration to that of FIG. 3, the power amplifier 110, the power supply 130, and the laser 140, are all connected to the modulator 120. The modulator 120 is connected to a polarization controller 150, which is coupled to a delay section 40. The optical switches 50, 52 of the delay section 40 are controlled by a signal generator 155, which outputs a square wave signal at 10 MHz. The output of the delay section 40 is connected to a detector 170, which detects the intensity-modulated optical signal. The output of the detector 170 is amplified by an amplifier 180, providing one input to a mixer 182. The second input to the mixer 182 comes from the 3 dB splitter 104. The sum and difference frequency products generated in the mixer 182 are fed to a second amplifier 180, which is connected to one trace of an oscilloscope 190. Due to the limited bandwidth of the second amplifier 180, only the difference frequency component of the mixer 182 output is passed from the amplifier 180 to the oscilloscope 190. A second trace on the oscilloscope 190 is fed by the signal generator 155. This configuration allow the display of the modulated optical phase from the mixer 182 and the signal generator 155 output.

The test configuration shown in FIG. 4 and described above allows for testing of sub-microsecond delay switching. The mixer 182 generates sum and difference frequency components of the two input signals, which area functions of the relative phase between the detected and the reference microwave signals. A constant relative phase results in a dc term at the output of the mixer 182. However, any variation in relative phase produces a change in the amplitude of the sum and difference frequency components generated by the mixer 182. Thus, when switching between the optical delay path 46 and the optical reference path 48, the amplitude of the output mixer 182 varies between two levels. The output of the mixer 182 is fed to a bandwidth limited amplifier 180, which amplifies the difference frequency component and eliminates the sum frequency component. Since the delay section 40 is switched with a signal generator 155 at 10 MHz, the output of the mixer 182 varies at a frequency of 10 MHz Note that a switching frequency of 10 MHz corresponds to a switching time of approx. 100 nanoseconds (nsec). The results are as expected, in that the modulated optical phase varies at the same frequency as the signal generator 155 drive voltage, thus confirming that the device of the present invention is capable of sub-microsecond switching.

Figure 5:
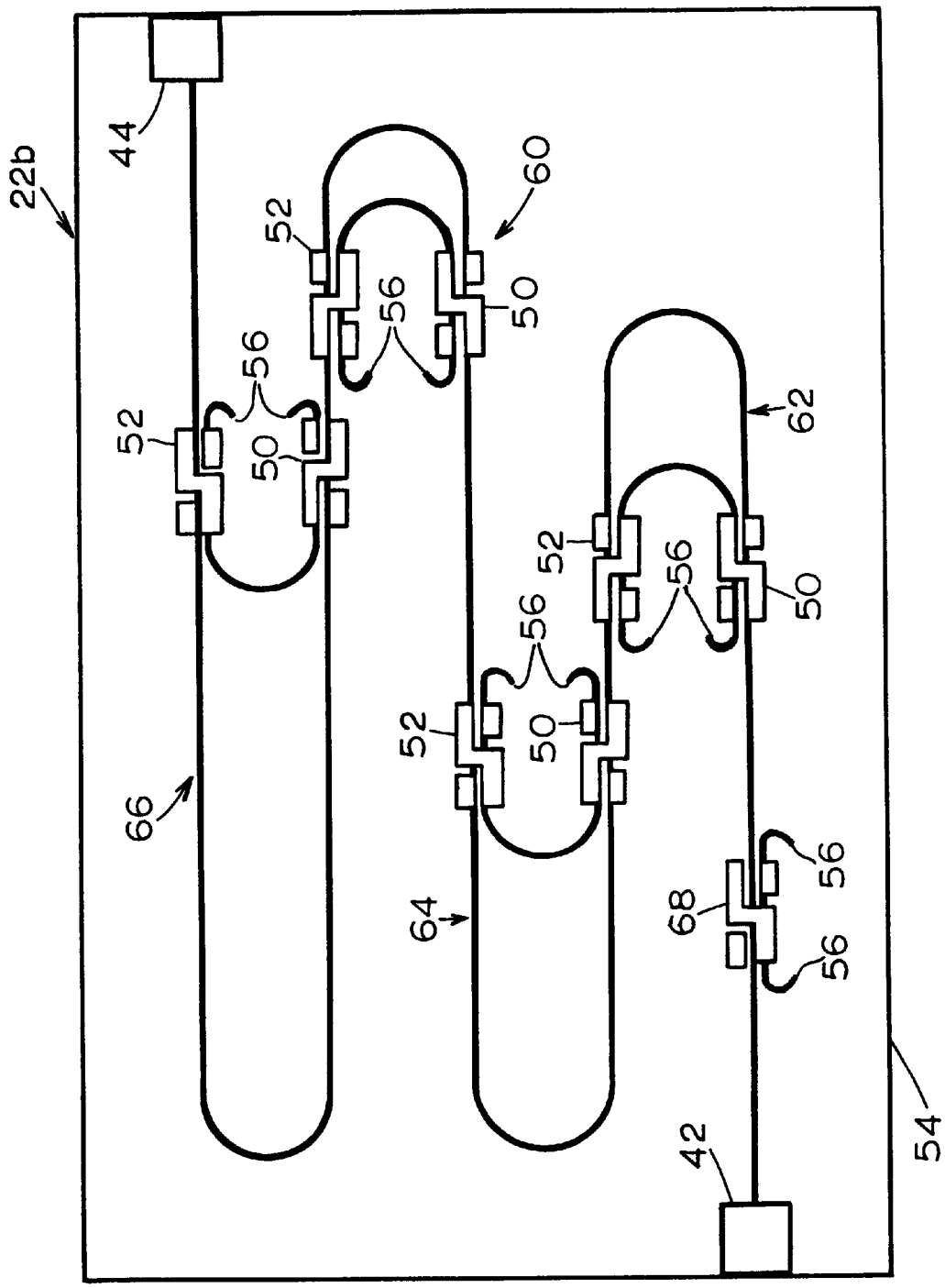
FIG. 5 is a diagram illustrating an alternative embodiment of a switchable delay block of the present invention including four trombone optical delay sections.

Referring, to FIG. 5, an alternate embodiment of a switchable delay block 22b of the present invention is shown. The delay block 22b includes four trombone optical delay sections 60, 62, 64, 66 cascaded together. Cascading multiple delay sections provides a greater range of time delays that can be selected for the delay block. If each trombone delay section has a unique delay time the four-bit embodiment shown allows delay selection from 16 different delays (including the reference path). In a particular embodiment, the delay times of the four cascaded trombone delay sections 60, 62, 64, 66 are 41, 82, 164, and 328 psec respectively, thus allowing any sum of the individual trombone section delay times to be chosen for the delay of the switchable delay block 22b.

Because each delay section has one input and one output, embodiments with cascaded delay sections have independent crosstalk characteristics between sections. Therefore, independent delay sections, as embodied in the present invention, have the benefit of low cross-talk for the delay block.

In addition to the use of multiple delay sections, an optional loss equalization switch 68 may be used. Due to linear path loss in optical waveguide propagation, different delay times have different associated path losses. The loss equalization switch 68 ensures that the optical power received at the detector 44 is always equal to the power received at the detector when the longest delay path is selected and the loss equalization switch 68 is set to have low loss, regardless of the delay path selected. The loss equalization switch 68 is used to maintain constant insertion loss at the optical emitter 42. In a preferred embodiment, the loss equalization switch 68 has one setting for each possible delay path. For example, for the four-bit embodiment of FIG. 5, the loss equalization switch 68 has 16 loss settings, which are preferably selected automatically as a particular delay is selected by the transceiver/control electronics 20.

Figure 6:
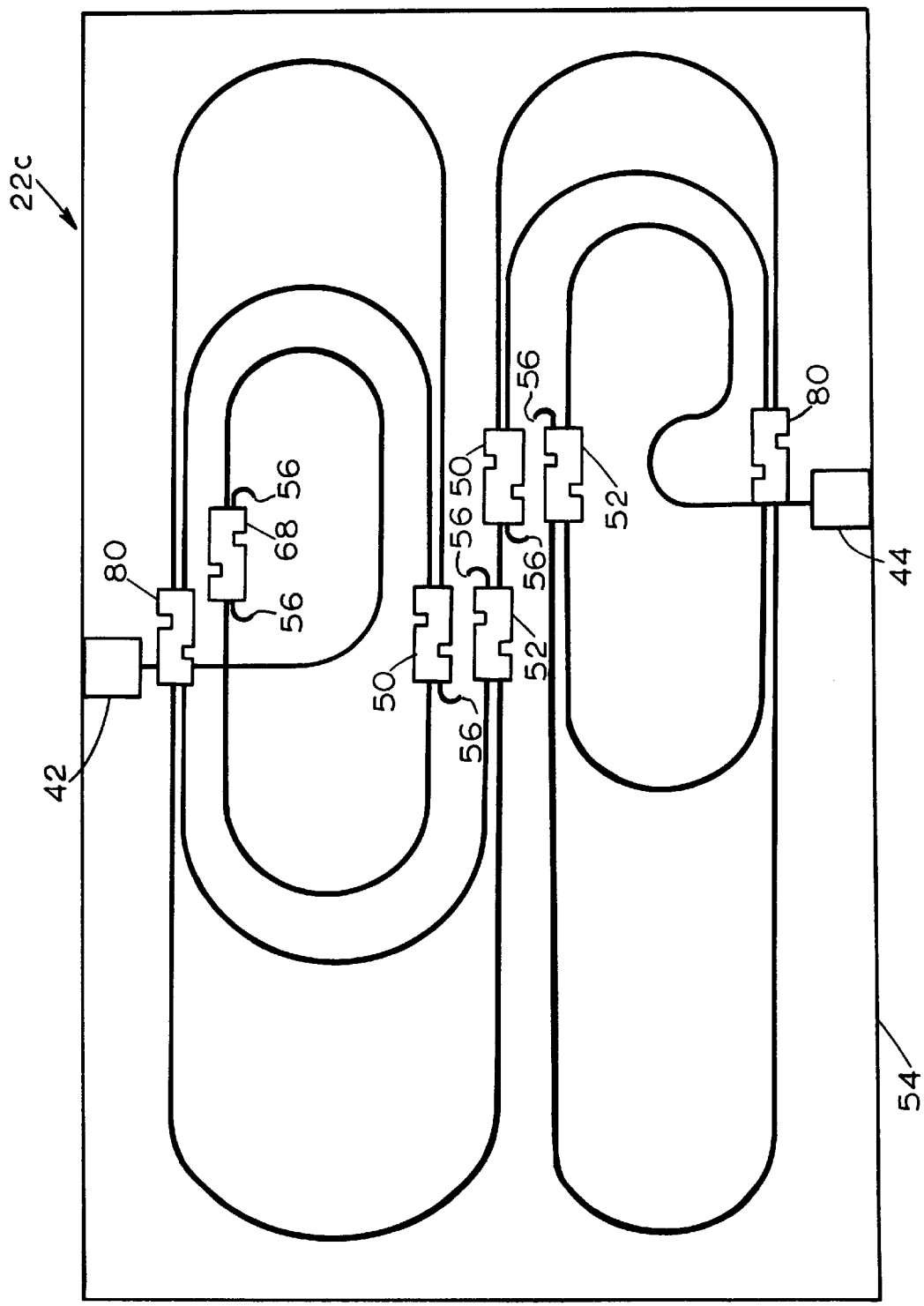
FIG. 6 is a diagram illustrating another embodiment of a switchable delay block of the present invention including a nested, four-bit, integrated-optical, switchable delay device utilizing trombone sections.

Referring to FIG. 6, another embodiment of a switchable delay block 22c is shown. The FIG. 6 embodiment includes a nested device architecture for a four-bit, integrated optical, switchable delay device utilizing trombone sections. The embodiment of FIG. 6 is an architectural variant of the embodiment shown in FIG. 5. Functionally, both embodiments are identical. However, the FIG. 6 nested embodiment 22c requires less substrate surface area making the delay block physically smaller.

FIG. 6 illustrates only one of many possible methods of nesting sections inside one another. In the nested configuration, the radii of the bends inside one another will preferably differ on the order of 50 microns. In some possible nesting configurations, the optical waveguides must cross one another. As long as the optical waveguides cross at angles close to 90° there is a minimum amount of coupling between the intersecting guides. As shown in FIG. 6, the optical waveguides cross one another in the vicinity of the optical emitter 42 and the optical detector 44. The waveguide connected to the optical emitter 42 passes through the optical switch 80 and intersects another waveguide at 90° on its way to the loss equalization switch 68. Likewise, the waveguide that feeds the optical detector 44 intersects other waveguides at 90° and passes through the optical switch 80. Note that optical cross-talk due to waveguide intersections at 90° may be neglected. Measurements have not been able to detect cross-talk, resulting from intersections, down to 50 dB below the optical power level in the waveguide, limited by the noise level present in the detection system. The embodiment shown in FIG. 6 utilizes two, two-input, two-output optical switches 80. Using these switches leads to smaller switchable delay block size. The two in/out optical switches 80 function identically to two single input, dual output switches 50, 52 coupled together.

In embodiments 22a and 22b each trombone optical delay section has one optical input and one optical output. This feature isolates the delay sections from one another in terms of cross-talk. The cross-talk of each delay section is independent of the cross-talk of any other delay section. Therefore, there is a significant improvement over prior methods, such as the Sullivan method described in the background section, which compounds cross-talk with each cascaded section. Embodiment 22c combines delay sections using a reduced number of switches, however embodiment 22c could be modified to provide isolation between each delay section by adding switches to appropriately isolate each section.

Of course, it should be understood that a range of changes and modifications can be made to the preferred embodiment described above. For example, one of the two nested sections in embodiment 22c of FIG. 6 could be folded onto the other nested section. However, when folding nested sections together it is necessary that waveguide crossings remain at angles close enough to 90° to achieve the required cross-talk isolation. Additionally, the optical emitter 42 and the optical detector 44 may or may not be included in the optical delay blocks 22a, 22b, and 22c. The optical emitter 42 and the optical detector 44 provide the functions of converting between electrical signals and optical signals. If a system comprising the delay block is all optical, there may be no need to convert electrical signals to optical signals or optical signals to electrical signals. Therefore, the optical emitter 42 and the optical detector 44 may be omitted from the optical delay blocks.

The preceding development and description was based on creating a signal with a relative time delay. This was accomplished by making the assumption that the shortest optical path was chosen as the reference path. However, it is possible to create a signal with a relative time advance by choosing the longest optical path as the reference. In choosing the longest path as reference, any other path is relatively shorter in length, and hence has a relatively shorter associated propagation time. The present invention may be used as a relative time delay device or as a relative time advance device, depending on the path defined as the reference path.

It is therefore intended that the foregoing detailed description be regarded as illustrative rather than limiting and that it be understood that it is the following claims, including all equivalents, which are intended to define the scope of this invention.

What is claimed is:

1. An optical delay block, comprising:
   an optical delay section comprising a first waveguide segment and a second waveguide segment each capable of conducting optical energy, each of said first and second waveguide segments comprising a different length, a first end and a second end, wherein at least one of said first and second ends of at least one of said first and second waveguide segments comprises a low-reflection termination, wherein said first waveguide segment, said second waveguide segment and said low-reflection termination are integrated onto a substrate.

2. The optical delay block of claim 1, wherein said substrate comprises lithium niobate.

3. The optical delay block of claim 1, wherein said first end of said first waveguide segment is used as an input.

4. The optical delay block of claim 3, wherein said low-reflection termination comprises a bend having a radius of approximately 0.5 millimeters.

5. An optical block, comprising:
   a first optical delay section having one input and one output;
   said first optical delay section comprising first and second waveguide segments capable of conducting optical energy, each waveguide segments comprising a different and each waveguide segment comprising a first end and a second end, wherein one of said waveguide segments comprises low-reflection terminations at either end;
   a first optical switch connecting said first ends of said waveguide segments and a second switch connecting said second ends of said waveguide segments, wherein said first and second optical switches channel optical energy through on of said first and second waveguide segments; and
   a loss equalization switch placed between said input and said first optical switch.

6. The optical delay block of claim 5, further comprising a second optical delay section, wherein an input of said second optical delay section is coupled to the output of said first optical delay section.

7. The optical delay block of claim 6, wherein said waveguide segments and said optical switches are arranged in a nested configuration.

8. The optical delay block of claim 7, wherein said waveguide segments intersect at an angle such that there is no cross-talk degradation from the intersection.

9. A method for delaying a signal, comprising the steps of:
   switching optical energy representing said signal into one of a plurality of waveguide paths;

one of said plurality of waveguide paths comprising a low-reflection termination having a bend comprising a small radius of curvature; and at least one of said plurality of waveguide paths comprising a length that causes said delay.

10. The method of claim 9, further comprising the steps of:

providing said optical energy with uniform power, regardless of whether or not said optical energy takes said at least one delay path.

11. The method of claim 10 further comprising the step of providing said one of said plurality of waveguide paths with cross-talk isolation from said plurality of waveguide paths.

12. The method of claim 10 wherein, said one of said plurality of waveguide paths and said plurality of waveguide paths are ananged in a nested configuration.

13. The method of claim 9, wherein said bend has a radius of curvature comprising approximately 0.5 millimeters.

14. An optical delay block comprising:

a first optical switch;

an input waveguide segment, capable of passing optical energy and located upstream from said first optical switch;

a plurality of intermediate waveguide segments, each capable of passing optical energy and located downstream from said first optical switch;

said first optical switch coupling optical energy received from said input waveguide segment to a selected one of said plurality of intermediate waveguide segments; and at least one of said plurality of intermediate waveguide segments terminating in a low-reflection termination, wherein said low-reflection termination comprises a bend in said intermediate waveguide, said bend having a small radius of curvature.

15. The optical delay block of claim 14 wherein said small radius comprises approximately 0.5 millimeters.

16. An optical delay block comprising:

a first optical switch;

an input waveguide segment, capable of passing optical energy and located upstream from said first optical switch;

a plurality of intermediate waveguide segments, each capable of passing optical energy and located downstream from said first optical switch;

said first optical switch coupling optical energy received from said input waveguide segment to a selected one of said plurality of intermediate waveguide segments; and at least one of said plurality of intermediate waveguide segments terminating in a low-reflection termination, and further comprising:

a second optical switch coupling optical energy received from at least some of said plurality of intermediate waveguide segments to an output waveguide segment;

said second optical switch located downstream of said first optical switch and upstream of said low-reflection termination and said output waveguide segment, wherein said low-reflection termination comprises a bend in said intermediate waveguide, said bend having a small radius of curvature.

17. The optical delay block of claim 16 wherein said small radius comprises approximately 0.5 millimeters.

* * * * *